United States Patent [19]

Tsurumaru

[11] Patent Number: 5,291,519
[45] Date of Patent: Mar. 1, 1994

[54] DIGITAL MOBILE COMMUNICATIONS TERMINAL EQUIPMENT AND RECEIVING METHOD THEREFOR

[75] Inventor: Makoto Tsurumaru, Tokyo, Japan
[73] Assignee: NEC Corporation, Tokyo, Japan
[21] Appl. No.: 837,268
[22] Filed: Feb. 18, 1992
[30] Foreign Application Priority Data
  Feb. 22, 1991 [JP] Japan .................... 3-028329
[51] Int. Cl.[5] .................... H04B 7/10; H04L 1/02
[52] U.S. Cl. .................... 375/12; 375/100; 455/133
[58] Field of Search ............ 375/12, 18, 40, 99–102; 455/132, 133, 296–297

[56] References Cited

U.S. PATENT DOCUMENTS

| | | | |
|---|---|---|---|
| 4,715,048 | 12/1987 | Masamura | 375/100 |
| 4,733,402 | 3/1988 | Monsen | 375/100 |
| 4,742,563 | 5/1988 | Fukumura | 455/132 |
| 5,065,411 | 11/1991 | Muto | 375/100 |
| 5,127,025 | 6/1992 | Okanoue | 375/100 |

FOREIGN PATENT DOCUMENTS

| | | | |
|---|---|---|---|
| 0459823 | 12/1991 | European Pat. Off. | 375/100 |
| 9107829 | 5/1991 | World Int. Prop. O. | 375/100 |

Primary Examiner—Curtis Kuntz
Assistant Examiner—Young Tse
Attorney, Agent, or Firm—Laff, Whitesel Conte & Saret

[57] ABSTRACT

A reference voltage ($V_{ref}$) is set to a received signal level corresponding to an anticipated data error rate and compared with outputs of intermediate frequency amplifiers (3-1, 3-2) by comparators (7-1, 7-2). When the outputs of the intermediate frequency amplifiers (3-1, 3-2) are lower than the reference voltage ($V_{ref}$), operation of receiving circuits (A12-1, B12-2) is stopped. At inter symbol interference amount calculating sections (6-1, 6-2), inter symbol interference amounts are calculated from auto-correlation parameters of preamble signal bit trains included in received signal data, and selectors (9-1, 9-2) are controlled so that a diversity branch having the least residual inter symbol interference amount or the highest S/N ratio is selected and the received signal data of the selected branch are inputted to an equalizing section (11). When a signal having a high data error rate is received, operation of the corresponding receiving circuit is stopped. Consequently, power consumption is minimized, the data error rate caused by residual inter symbol interferences is minimized and data errors caused by thermal noises and other factors are also improved.

2 Claims, 6 Drawing Sheets

PREAMBLE :0 0 1 0 0 1 0 1 1 1 0 0 0 0 1 0 0 0 1 0 0 1 0 1 1 1

P(-5) P(-1) ⟵ C(0)~C(15) ⟶ P(+1) P(+5)

C (i) : +1,-1,+1,+1,+1,-1,-1,-1,-1,+1,-1,-1,-1,+1,-1,-1

DIGITAL MOBILE COMMUNICATIONS TERMINAL EQUIPMENT AND RECEIVING METHOD THEREFOR

BACKGROUND OF THE INVENTION

1. Field of the Invention

This invention relates to digital mobile communications terminal equipment and a receiving method therefor.

2. Description of Related Art

In mobile communications, it is possible to assume that its transmission line is a multiplex wave propagation path which includes a plurality of arrival routes of radio waves for a mobile station due to the influence of configuration of the land and buildings around the mobile station. In high speed transmission, wherein the difference in time between the arrival of advanced waves and delayed waves in this multiplex wave propagation is equivalent to a length of a symbol, frequency selective fading takes place, which causes an intersymbol interference between the advanced and delayed waves. An equalizer of each terminal equipment is provided for detecting a transmission signal from received data which suffer from such intersymbol interference.

An exemplary conventional receiving circuits including such an equalizer is shown in FIG. 1. Referring to FIG. 1, a signal received through antenna 25 successively passes high frequency amplifier 26, intermediate frequency amplifier 27, demodulator 28 and equalizer 31 to be demodulated. Equalizer 31 includes transmission path estimating section 29 and equalizing section 30, and the output of demodulator 28 is connected to both propagation path estimating section 29 and equalizing section 30.

General operation of equalizer 31 is described subsequently. Propagating path estimating section 29 detects an auto-correlation of a known preamble bit train contained in received signal data inputted from demodulator 28 and effects estimation of a propagating path using a bit train wherein this auto-correlation function makes an impulse. A result of estimation obtained by the propagating path estimation, that is, a parameter of the amount of the intersymbol interferences, is sent to equalizing section 30, at which reverse conversion using the intersymbol interferences is preformed to equalize the signal data into data which would have been transmitted from a transmitter.

The conventional receiving circuit including an equalizer is disadvantageous in that, if the communication quality is deteriorated by frequency selective fading or the like, then the received signal level drops and the error rate of demodulated data becomes high. As a countermeasure, a diversity receiving system based on comparison in received signal level is employed. However, such a diversity receiving system has a drawback in that, since the received signal level and the intersymbol interference amount have no correlation between them, even if a diversity branch of a high received signal level is selected, deterioration in characteristic caused by intersymbol interference cannot be improved. Further, diversity signal reception requires two or more receiving circuits, and consequently, there is the drawback that reduction in power consumption cannot be achieved. It is another drawback that, even if the received signal level drops to such a degree that data obtained by demodulation are in error at an error rate higher than an anticipated level and accordingly cannot be adopted as demodulated data, equalizing processing is still performed for such data, and consequently, unnecessary circuit operation is performed and excessive power consumption is wasted.

SUMMARY OF THE INVENTION

It is an object of the present invention to provide digital mobile communications terminal equipment and a receiving method thereof wherein the error rate of data caused by residual intersymbol interference is low and power consumption is low.

In order to attain the object, according to one aspect of the present invention, there is provided digital mobile communications terminal equipment having an equalizer for compensating for frequency selective fading included in a received signal further comprising an equalizing processing controlling circuit which starts and stops equalizing processing of said equalizer in response to the level of the received signal and a diversity branch selecting circuit for adaptively selecting one of a plurality of diversity branches in a selection-after-detection diversity receiving circuit including said equalizing processing controlling circuit which selects a diversity branch having the least residual intersymbol interference when intersymbol interference exceeds the equalizing capacity of said equalizer, and selects a diversity branch having the highest S/N ratio when intersymbol interference does not exceed the equalizing capacity of said equalizer.

The number of the diversity branches may be two or three or more.

Preferably, the digital mobile communications terminal equipment further comprises means for stopping operation of receiving circuits of a diversity branch which has received a signal with a level lower than prescribed reference level.

According to another aspect of the present invention, there is provided a receiving method for a digital mobile communications terminal equipment having a selection-after-detection diversity receiving circuit and an equalizer for compensating for frequency selective fading included in a received signal, which comprises the steps of selecting one of a plurality of diversity branches having the least residual intersymbol interference in that, when the intersymbol interferences which are produced between received radio waves and delayed waves of such received radio waves exceed the equalizing capacity of said equalizer, and of selecting a diversity branch having a highest S/N ratio when such intersymbol interference does not exceed the equalizing capacity.

Preferably, the receiving method for digital mobile communications terminal equipment further comprises the steps of comparing the level of the received signals with a preset reference level for each diversity branch, and of stopping the receiving operation of a diversity branch which the received level is lower than a prescribed reference level.

The above and other objects, features and advantages of the present invention will become apparent from the following description and the appended claims, taken in conjunction with the accompanying drawings.

DESCRIPTION OF THE PREFERRED EMBODIMENTS

Figure 1:
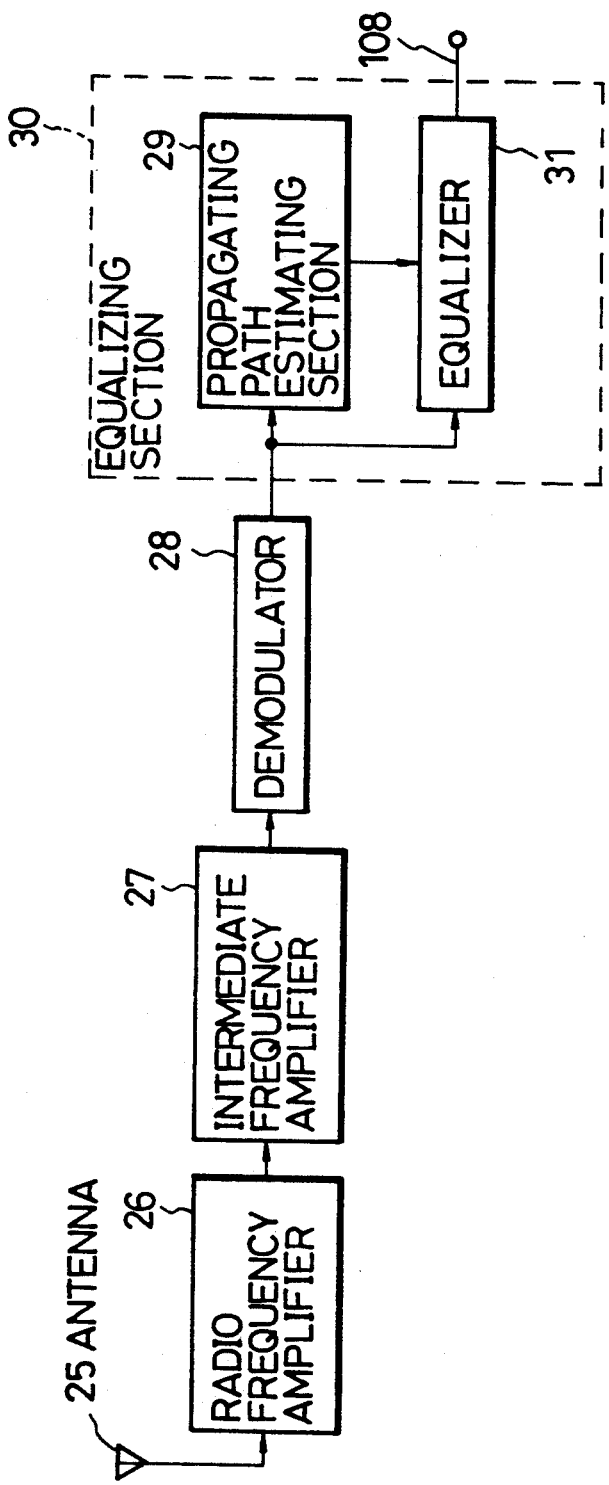
FIG. 1 is a block diagram of a conventional receiving circuit of digital mobile communications terminal equipment.
Figure 2:
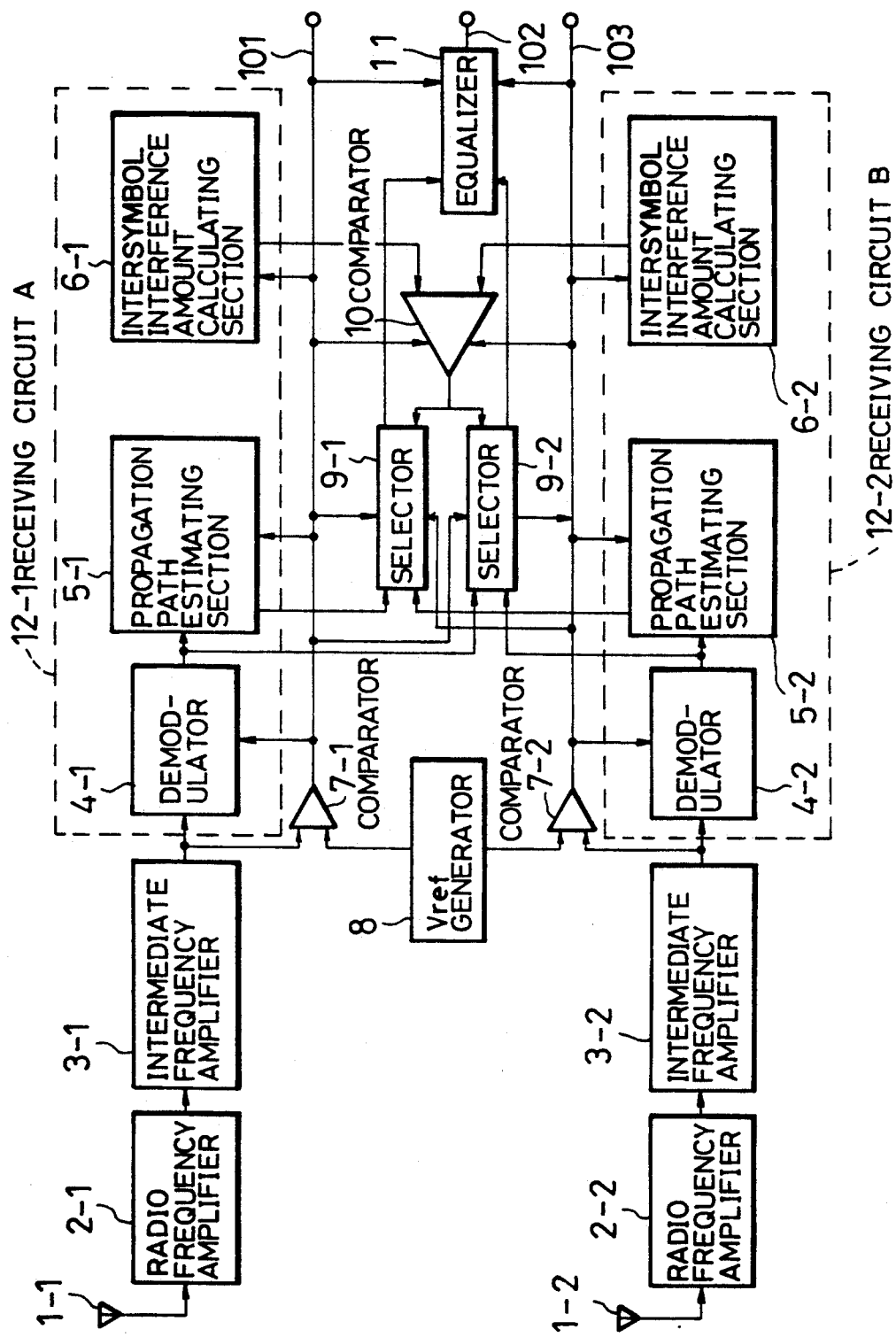
FIG. 2 is a block diagram of a first preferred embodiment of digital mobile communications terminal equipment with a two-branch diversity receiving circuit according to the present invention.

FIG. 2 shows a first embodiment of digital mobile communications terminal equipment with a two-branch diversity receiving circuit according to the present invention. A signal received by antenna 1-1 is successively inputted to high frequency amplifier 2-1, intermediate frequency amplifier 3-1 and demodulator 4-1, and the output of demodulator 4-1 is inputted to propagation path estimating section 5-1 and selector 9-2. The output of propagation path estimating section 5-1 is inputted to another selector 9-1. Another signal received by another antenna 1-2, which is disposed at a spatial position having no relation to the received signal of antenna 1-1, is successively inputted to high frequency amplifier 2-2, intermediate frequency amplifier 3-2 and demodulator 4-2, and the output of demodulator 4-2 is inputted to propagation path estimating section 5-2 and selector 9-2. The output of propagation path estimating section 5-2 is inputted to selector 9-1. The output of intermediate frequency amplifier 3-1 is compared as a received signal level with output level $V_{ref}$ of reference voltage generator 8 by comparator 7-1, and the output of comparator 7-1 is connected to demodulator 4-1, propagation path estimating section 5-1, intersymbol interference amount calculating section 6-1, selectors 9-1 and 9-2, comparator 10 and equalizing section 11. Similarly, output of intermediate frequency amplifier 3-2 is compared with output level $V_{ref}$ of reference voltage generator 8 by another comparator 7-2, and the output of comparator 7-2 is connected to demodulator 4-2, propagation path estimating section 5-2, another intersymbol interference amount calculating section 6-2, selectors 9-1 and 9-2, comparator 10 and equalizing section 11. Outputs of intersymbol interference amount calculating sections 6-1 and 6-2 are compared with each other by comparator 10, and the output of comparator 10 is inputted to selectors 9-1 and 9-2. Outputs of selectors 9-1 and 9-2 are inputted to equalizing section 11.

Figure 3:
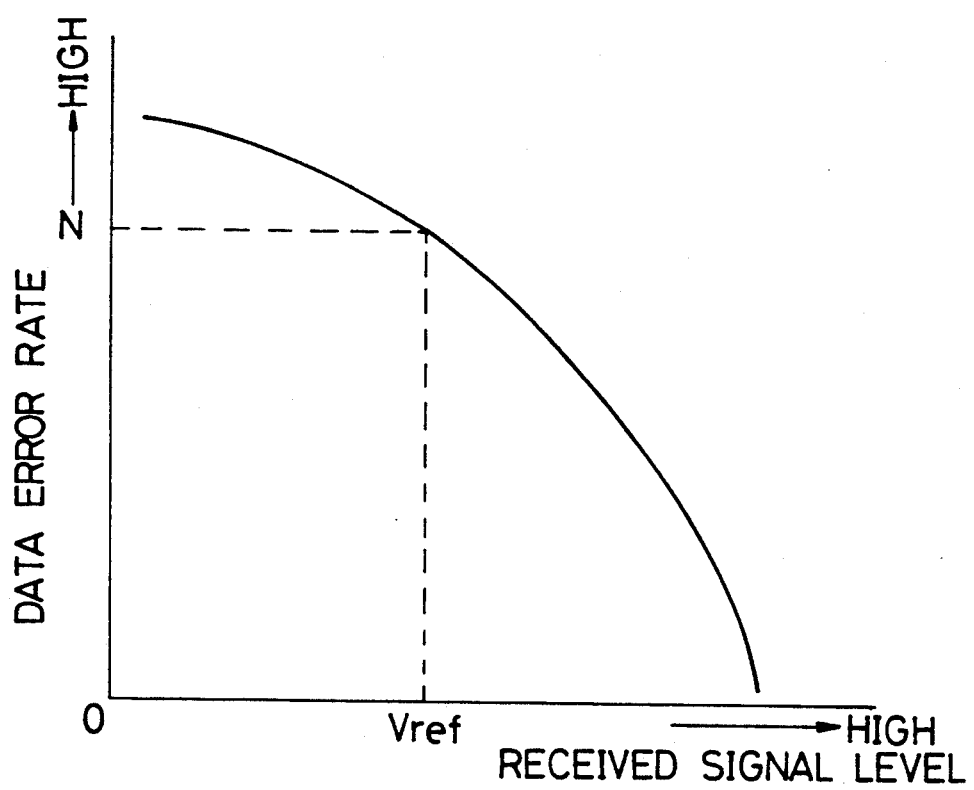
FIG. 3 is a diagram showing the relationship between a received signal level and a data error rate.

FIG. 3 illustrates the relationship between received signal level and data error rate, and in FIG. 3, when an anticipated data error rate is given by N, a corresponding received signal level is given by $V_{ref}$. FIG. 3 thus indicates that, if the received signal level is higher than $V_{ref}$, then such data can be treated as effective received data. Thus, level $V_{ref}$ is set to reference voltage generator 8, and when the output of intermediate frequency amplifier 3-1 is lower than level $V_{ref}$, circuit operation of receiving circuit A12-1 constituted from demodulator 4-1, propagation path estimating section 5-1 and intersymbol interference amount calculating section 6-1 and of comparator 10 is stopped. Selectors 9-1 and 9-2 operate then to inhibit the output of receiving circuit A12-1. Similarly, when the output of intermediate frequency amplifier 3-2 is lower than level $V_{ref}$, circuit operation of another receiving circuit B12-2 constituted from demodulator 4-2, propagation path estimating section 5-2 and intersymbol interference amount calculating section 6-2 and of comparator 10 is stopped. Selectors 9-1 and 9-2 then operate to inhibit the output of receiving circuit B12-2. Equalizing section 11 stops its circuit operation when outputs of both intermediate frequency amplifiers 3-1 and 3-2 are lower than level $V_{ref}$. In this instance, receiving circuit A enabling signal 101 and receiving circuit B enabling signal 103 may be constantly monitored by means of a CPU (central processing unit) or the like so that error processing may be performed when both signals represent a disabling condition.

Subsequently, operation of intersymbol interference amount calculating sections 6-1 and 6-2 is described. When it is assumed that the known preamble is an M bit train signal of 26 bits (false noise) illustrated in FIG. 4 and the equalization processable time is a 4-bit sequence, the following processing is performed.

Step 0: the preamble estimation portion given by the equation (1) below is detected from a received signal:

$$R(0), R(1), \ldots, R(25) \qquad (1)$$

Step 1: the correlation between central 16 bits of the preamble given by equation (2) below and the received signal bit train detected at step 0, and eleven correlation values given by equation (3) below are calculated in accordance with equation (4) below:

$$(C(i); i = 0, 1, \ldots, 15; (C(i) = \{-1, +1\}) \qquad (2)$$
$$\mathrm{Corr}(i)(i = -5, -4, \ldots, +5) \qquad (3)$$
$$\mathrm{Corr}(-5) = C(0)^*R(0) + C(1)^*R(1) + \ldots + C(15)^*R(15) \qquad (4)$$
$$\mathrm{Corr}(-4) = C(0)^*R(1) + C(1)^*R(2) + \ldots + C(15)^*R(16)$$
$$\vdots$$
$$\mathrm{Corr}(+5) = C(0)^*R(10) + C(1)^*R(11) + \ldots + C(15)^*R(25)$$

Figures 4, 5:
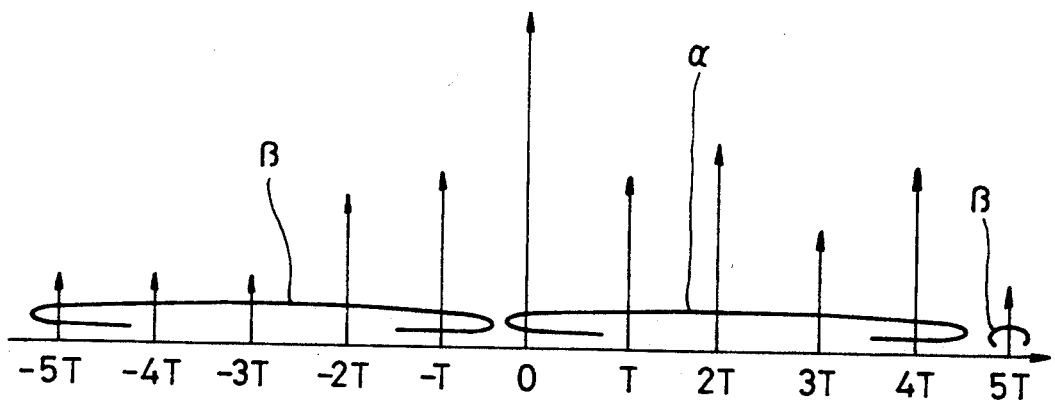
FIG. 4 is a diagrammatic representation showing an exemplary preamble signal bit train.
FIG. 5 is a diagram showing the correlation of a preamble portion of a received wave.

An exemplary correlation is shown in FIG. 5.

Step 2: using the eleven correlation values (refer to equation (5) below) obtained at step 1, a correlation value (refer to equation (7) below) at which equation (6) presents the maximum value is calculated:

$$\mathrm{Corr}(-5), \mathrm{corr}(-4), \ldots, \mathrm{Corr}(+5) \qquad (5)$$

$$\{\mathrm{corr}(i)\}^2 + \{(\mathrm{Corr}(i+1)\}^2 + \{\mathrm{Corr}(i+2)\}^2 + \{\mathrm{Corr}(i+3)\}^2 + (\mathrm{Corr}(i+4)\}^{26} \qquad (6)$$

$$\mathrm{Corr}(i)^*, \mathrm{Corr}(i+1)^*, \mathrm{Corr}(i+2)^*, \mathrm{Corr}(i+3)^*, \mathrm{Corr}(i+4)^* \qquad (7)$$

The mark "*" in equation (7) above represents a conjugate complex number.

Step 3: the parameter $\alpha$ is calculated in accordance with following equation (8):

$$\alpha = \{\mathrm{Corr}(i)^*\}^2 + \{\mathrm{Corr}(i+1)^*\}^2 + \{\mathrm{Corr}(i+2)^*\}^2 + \{\mathrm{Corr}(i+3)^*\}^2 + \{\mathrm{Corr}(i+4)^*\}^2 \qquad (8)$$

Step 4: another parameter $\beta$ is calculated in accordance with following equation (9):

$$\beta = \sum_{i=-5}^{+5} \{Corr(i)\}^2 - \alpha \quad (9)$$

Step 5: the ratio between parameters $\alpha$ and $\beta$ is calculated in accordance with the following equation to determine criterion S for the intersymbol interference amount:

$$S = \alpha/\beta$$

Selectors 9-1 and 9-2 are controlled so that criteria S1 and S2 obtained in accordance with the processing procedure as described above from intersymbol interference amount calculating sections 6-1 and 6-2, respectively, are compared with each other to select one of the branches which presents a higher value than the other. Then, equalizing processing is performed using the result of propagation path estimation of the selected branch by equalizing section 11, and equalization data 102 are outputted from equalizing section 11.

Figure 6:
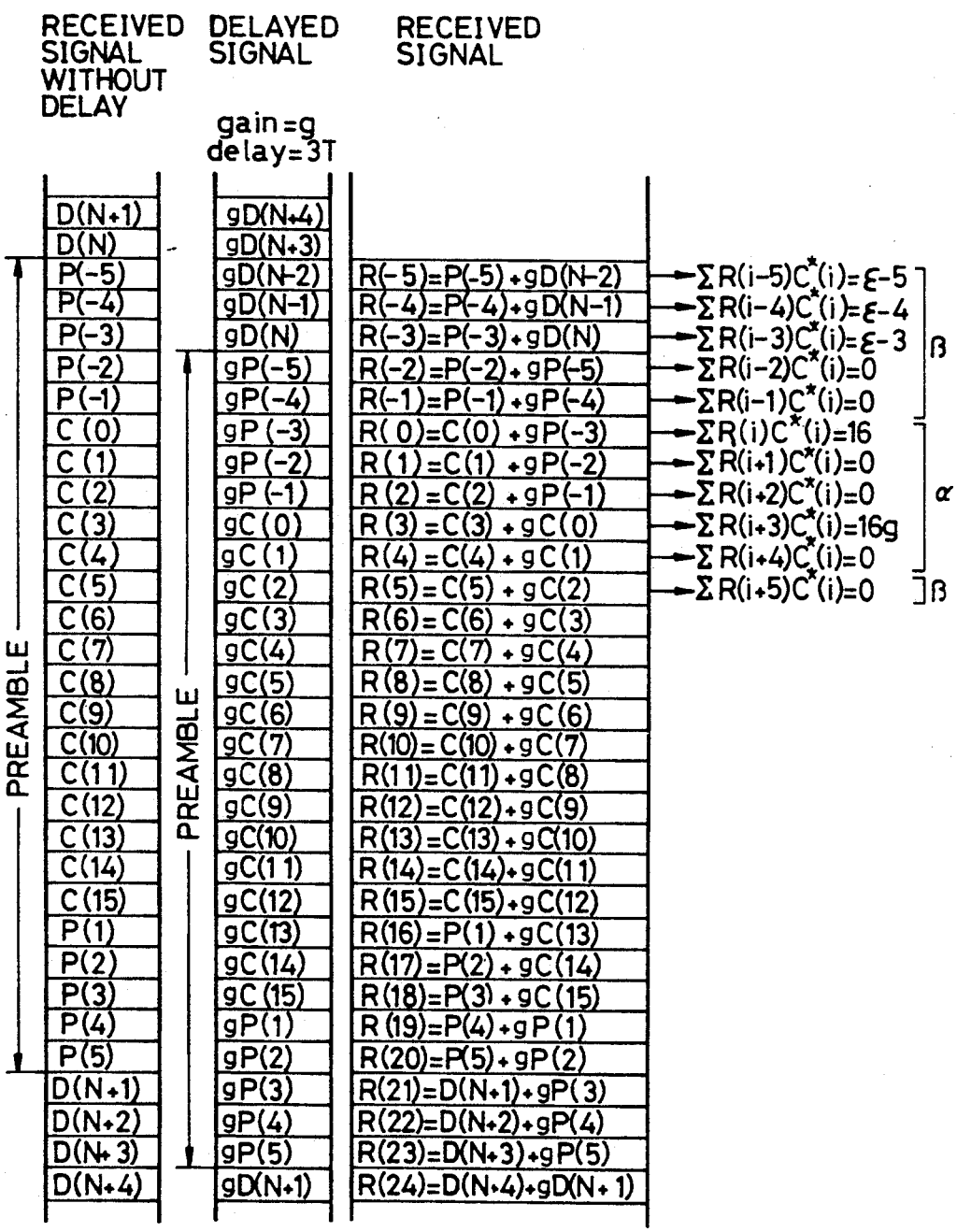
FIG. 6 is a diagrammatic representation showing a received wave when a delayed wave of gain g and a 3-bit delay time is produced.

FIG. 6 illustratively shows a received wave when a delayed wave of gain g and a 3-bit delay is produced. In this instance, only intersymbol interference which is lower than the equalizing capacity of equalizing section 11 are present, and accordingly, if propagation path estimation can be performed ideally, then parameter $\beta$ is reduced to "0". However, since a preamble of a limited length of 26 bits is employed in the example shown, data D(i) other than this preamble have an influence on propagation path estimation, and consequently, errors $\epsilon$-3 to $\epsilon$-5 appear in parameter $\beta$ and deterioration in SN (signal-to-noise) ratio in selection of a branch takes place equivalently. Therefore, it is decided whether intersymbol interference exceeds the equivalent capacity depending upon whether the value $\alpha/(\alpha+\beta)$ exceeds fixed level "V". If the decision is such that the value exceeds fixed level "V", i.e., $\alpha/(\alpha+\beta)<V$, then parameter $\beta$ includes residual intersymbol interference as a principal component, and consequently, branch selection is performed using $S=\alpha/\beta$. On the contrary, if value $\alpha/(\alpha+\beta)$ does not exceed fixed level "V", i.e., $\alpha/(\alpha+\beta)>V$, then since parameter $\beta$ is dominated by such errors as described above and noise components, branch selection with a higher degree of accuracy can be made by using received preamble power $P=\alpha+\beta$ as the criterion in selection.

Figure 7:
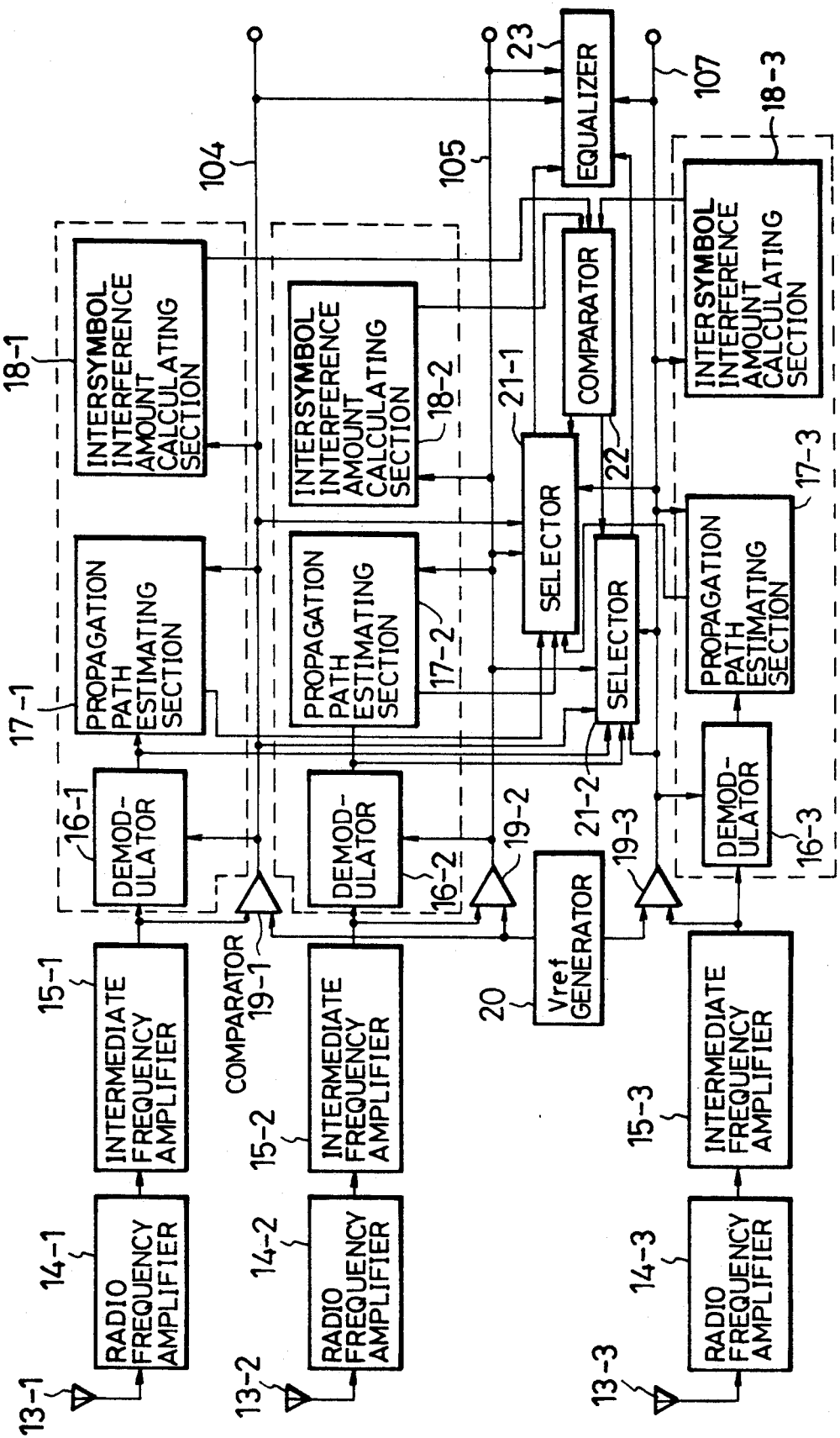
FIG. 7 is a block diagram of a second preferred embodiment of digital mobile communication terminal equipment with three-branch diversity receiving circuit according to the present invention.

Referring now to FIG. 7, there is shown a second embodiment of digital mobile communications terminal equipment with a three-branch diversity receiving circuit according to the present invention. The diversity receiving circuit system of the present embodiment employs a propagation path estimating method and a branch selecting method similar to those of the diversity receiving circuit system of the preceding embodiment shown in FIG. 2, but includes three receiving circuits so that the advantage that a system having higher receiving characteristics than that of the first embodiment.

I claim:

1. A digital mobile communications terminal equipment having an equalizer for compensating for frequency selective fading in a received signal, said equipment comprising;
   an equalizing processing controlling circuit which stops an equalizing of said equalizer to a diversity branch having a received signal level which is lower than a preset reference value; and
   a diversity branch selecting circuit for adaptively selecting one of a plurality of diversity branches of a selection-after-detection diversity receiving circuit including said equalizing processing controlling circuit which selects a diversity branch having the least residual intersymbol interference when residual intersymbol interferences of said diversity branches exceed the equalizing the ability of said equalizer and selects a diversity branch having the highest S/N ratio when residual intersymbol interferences do not exceed the equalizing ability of said equalizer.

2. A receiving method for digital mobile communications terminal equipment having a selection-after-detection diversity receiving circuit and an equalizer for compensating for frequency selective fading in a received signal, said method comprising the steps of stopping said equalizer in a diversity branch when its received signal level is lower than a preset reference value, selecting a diversity branch from a plurality of diversity branches, the selected branch having the least residual intersymbol interference when the residual intersymbol interferences of said plurality of diversity branches exceed the equalizing ability of said equalizer, and selecting a diversity branch having a highest S/N ratio when the residual intersymbol interferences of said plurality of diversity branches do not exceed the equalizing ability of said equalizer.

* * * * *